US008828585B2

(12) United States Patent
Ha et al.

(10) Patent No.: US 8,828,585 B2
(45) Date of Patent: Sep. 9, 2014

(54) EQUAL DISTRIBUTION-TYPED CONNECTING MEMBER, AND BATTERY PACK EMPLOYED WITH THE SAME

(75) Inventors: Jin Woong Ha, Daejeon (KR); JaeSeong Yeo, Daejeon (KR); Yongshik Shin, Daejeon (KR); Jeeho Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 961 days.

(21) Appl. No.: 12/446,807

(22) PCT Filed: Sep. 29, 2007

(86) PCT No.: PCT/KR2007/004774
§ 371 (c)(1),
(2), (4) Date: Dec. 18, 2009

(87) PCT Pub. No.: WO2008/050953
PCT Pub. Date: May 2, 2008

(65) Prior Publication Data
US 2010/0092854 A1 Apr. 15, 2010

(30) Foreign Application Priority Data
Oct. 23, 2006 (KR) .................... 10-2006-0102631

(51) Int. Cl.
*H01M 2/24* (2006.01)
*H01R 4/58* (2006.01)
*H01B 5/00* (2006.01)
*H01M 2/26* (2006.01)
*H01M 2/20* (2006.01)

(52) U.S. Cl.
CPC ............... *H01M 2/206* (2013.01); *H01M 2/26* (2013.01); *Y02E 60/12* (2013.01)
USPC ........ 429/158; 429/160; 439/212; 174/126.1; 428/573

(58) Field of Classification Search
USPC ........... 429/158–159; 439/504–514, 212–213
See application file for complete search history.

(56) References Cited

U.S. PATENT DOCUMENTS 6,423,441 B1 * 7/2002 Ronning et al. ............... 429/82
(Continued)

FOREIGN PATENT DOCUMENTS

JP  2001167753 A  * 6/2001
JP  2003-346772 A    12/2003

OTHER PUBLICATIONS

JP 2003-346772 A, JPO Machine Translation, Retrieved Mar. 27, 2012.*
(Continued)

*Primary Examiner* — Maria J Laios
*Assistant Examiner* — Robert S Carrico
(74) *Attorney, Agent, or Firm* — Birch, Stewart, Kolasch & Birch, LLP

(57) ABSTRACT

Disclosed herein are an equal distribution type connecting member for connecting two or more devices to an external circuit, the connection member including a first connection circuit connected to a connection point of the external circuit, and second connection circuits sequentially connected to the first connection circuit, the second connection circuits being constructed in a structure in which the sectional areas of the second connection circuits are increased and/or the lengths of the second connection circuits are decreased with the increase of the connection distance between the connection point of the external circuit and connection points of the devices, thereby equalizing internal resistances between the connection point of the external circuit and the connection points of the devices, and a middle- or large-sized battery pack including the same. The equal distribution type connecting member according to the present invention is capable of reducing the difference in internal resistances of the circuits, thereby increasing the overall life span of the battery pack. Also, the uniform charging and discharging efficiency of battery modules or battery cells is acquired, and therefore, it is possible to manufacture battery modules having optimized performance and a middle- or large-sized battery pack including the same.

4 Claims, 2 Drawing Sheets

(56) References Cited

U.S. PATENT DOCUMENTS

2003/0194889 A1\* 10/2003 Golat et al. .................... 439/79
2006/0160422 A1 7/2006 Bang et al.
2006/0170394 A1 8/2006 Ha et al.
2006/0194101 A1 8/2006 Ha et al.

OTHER PUBLICATIONS

JP 2001167753 A, JPO machine translation.\*

\* cited by examiner

EQUAL DISTRIBUTION-TYPED CONNECTING MEMBER, AND BATTERY PACK EMPLOYED WITH THE SAME

FIELD OF THE INVENTION

The present invention relates to an equal distribution type connecting member, and, more particularly, to a connecting member for connecting two or more devices to an external circuit to equalize internal resistances between the connection point of the external circuit and connection points of the devices, and a middle- or large-sized battery pack including the same.

BACKGROUND OF THE INVENTION

Recently, a secondary battery, which can be charged and discharged, has been widely used as an energy source for wireless mobile devices. Also, the secondary battery has attracted considerable attention as an energy source for electric vehicles and hybrid electric vehicles, which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery pack having a plurality of unit cells electrically connected with each other because high output and large capacity are necessary for the middle- or large-sized devices.

The middle- or large-sized battery pack, which is used as a charging and discharging power source for electric vehicles and hybrid electric vehicles, is manufactured by electrically connecting a plurality of battery modules in series/parallel with each other and mechanically coupling the battery modules to each other. Consequently, the electrical connection between the battery modules is carried out by various kinds of bus bars, such as wires, copper plates, printed circuit boards (PCB), and flexible printed circuit boards (flexible-PCB).

However, the distances between the connection point of an external circuit and connection points of the battery modules are different from each other due to the structural characteristics of the battery pack including the battery modules connected to each other. Specifically, the difference of internal resistances occurs at the respective battery module connection points due to the difference in length of bus bars connected between the external circuit connection point and the respective battery module connection points, with the result that, when high-voltage current flows, during the charging process or the discharging process, the current difference between the respective battery modules occurs.

A middle- or large-sized battery pack for electric vehicles is required to operate for a long period of time, and high-temperature, high-voltage current flows in the middle- or large-sized battery pack. As a result, the difference of the operating conditions, caused due to the small difference of the internal resistance, facilitates the degradation of some battery modules (specifically, the degradation of battery cells constituting the respective battery modules, whereby the overall life span of the battery pack is reduced.

Consequently, some researches have been carried out to solve the above-described problems. For example, Japanese Patent Application Publication No. 2003-346772 discloses circuits ('connection circuits') connected between cathode and anode plates of a battery cell and electrode plate connection parts, wherein the connection circuits are constructed in a structure in which the lengths or thicknesses of the connection circuits are changed depending upon the distances between the respective connection circuits such that the connection circuits have the same internal resistance.

In the method of changing the lengths or thicknesses of the connection circuits to equalize the internal resistances, however, the sectional area of the connection circuits is calculated based on the lengths of the connection circuits to design the connection circuits such that the respective connection circuits have corresponding shapes (lengths or thicknesses). As a result, the connection circuits have complicated shapes, and therefore, it is difficult to manufacture the connection circuits, and, in addition, the manufacturing costs of the connection circuits are increased.

Also, during the construction of the middle- or large-sized battery pack, it is required to manufacture different connection circuits which are precisely calculated such that the internal resistances are equalized depending upon the positional change of the battery modules. Furthermore, the internal resistances of the circuits are changed by the temperature. Consequently, the internal resistances of the connection circuits, the lengths or thicknesses of which are previously set as described above, may be changed depending upon the change of the temperature under an actual operating condition, the accurate estimate of which is actually limited to construct the connection circuits. Also, the change in shape of the connection circuits due to the change in design frequently occurs, and therefore, the extensionability and flexibility of the connection circuits are greatly lowered.

Consequently, there is a high necessity for a technology that is capable of fundamentally solving the above-mentioned several problems.

SUMMARY OF THE INVENTION

Therefore, the present invention has been made to solve the above problems, and other technical problems that have yet to be resolved.

Specifically, it is an object of the present invention to provide a connecting member that is capable of reducing the difference of internal resistances due to a conducting wire or a circuit to allow battery modules having optimized performance and a middle- or large-sized battery pack including the same to be manufactured.

In accordance with one aspect of the present invention, the above and other objects can be accomplished by the provision of a connecting member for connecting two or more devices to an external circuit, the connection member including a first connection circuit connected to a connection point of the external circuit, and second connection circuits sequentially connected to the first connection circuit, the second connection circuits being constructed in a structure in which the sectional areas of the second connection circuits are increased and/or the lengths of the second connection circuits are decreased with the increase of the connection distance between the connection point of the external circuit and connection points of the devices, thereby equalizing internal resistances between the connection point of the external circuit and the connection points of the devices.

Generally, a bus bar is a connecting member used to perform the electrical connection between devices. A copper plate, a printed circuit board (PCB), or a flexible printed circuit board (flexible-PCB) may be used as the bus bar.

When a plurality of devices are interconnected using the conventional connecting members to construct a connection circuit, however, the connection distances between the connection point of the external circuit and the respective connection points of the devices are different from each other, as previously described. As a result, the difference of internal resistances occurs due to the different lengths of the bus bars, and therefore, the minute current difference occurs between the devices.

In the connecting member according to the present invention, on the other hand, the connecting member, for connecting the connection point of the external circuit and the connection points of the devices, includes the first connection circuit and the second connection circuits. The first connection circuit, connected to the connection point of the external circuit, is used in common, and the second connection circuits, connected between the first connection circuit and the connection points of the respective devices, are manufactured such that the sectional areas and/or the lengths of the second connection circuits are different from each other. Consequently, as previously described, the present invention accomplishes the reduction of the manufacturing costs and improves the flexibility or extensionability based on resistances as compared to the conventional art.

Also, the internal resistances between the connection point of the external circuit and the connection points of the respective devices are uniform, and therefore, the current difference does not occur.

When the sectional areas of the second connection circuits are to be increased such that the internal resistances are uniform, the sectional areas of the second connection circuits may be increased by the widths and/or thicknesses of the second connection circuits.

In the connecting member according to the present invention, the first connection circuit is preferably constructed in a structure in which the first connection circuit is connected to the connection point of the external circuit while the first connection circuit has a uniform width and thickness.

The first connection circuit and the second connection circuits may be each independently metal plates, wires, bus bars, flexible bus bars, or circuits printed on boards. For example, the first connection circuit and the second connection circuits may be printed on a single board. In this case, the first connection circuit and the second connection circuits are easily attached to or detached from the devices in manufacturing the battery module, and therefore, the productivity and maintenanceability are improved.

The material for the first connection circuit and the second connection circuits is not particularly restricted so long as the first connection circuit and the second connection circuits are made of a conductive material. In a preferred embodiment, the first connection circuit and the second connection circuits are made of a metal material. For example, the first connection circuit and the second connection circuits may be metal wires or metal plates. Preferably, the metal plates are used for the material for the first connection circuit and the second connection circuits because the metal plates are easily cut according to predetermined shapes based one the calculation of resistance values in consideration of the arrangement pattern and location of the devices.

The first connection circuit and the second connection circuits may be manufactured simultaneously by cutting a single metal plate, whereby the material costs are reduced, and the productivity is improved.

In this case, the metal plate constituting the second connection circuits has the same thickness as that of the metal plate constituting the first connection circuit, and the widths of the second connection circuits are increased and/or the lengths of the second connection circuits are decreased with the increase of the connection distance between the connection point of the external circuit and the connection points of the devices, whereby the internal resistances between the connection point of the external circuit and the connection points of the respective devices are uniform.

When the metal plate is cut to obtain the connection circuits, the metal plate may be cut such that the second connection circuits are connected to the first connection circuit. On the other hand, the metal plate may be cut such that the second connection circuits are separated from the first connection circuit, and then the second connection circuits may be connected to the first connection circuit by welding or soldering. Alternatively, through-holes are formed at the end of the conductive connecting member, and then the respective connection circuits are bolted into the through-holes, such that the electrical connection between the first connection circuit and the second connection circuits is accomplished.

The devices are not particularly restricted so long as the devices are constructed in a structure requiring the electrical connection. Preferably, each device is a battery cell that can be charged and discharged or a battery module including a plurality of battery cells. Specifically, it is possible to manufacture a middle- or large-sized battery pack constructed in a structure in which a plurality of battery modules are connected in series and/or parallel with each other using the connecting member according to the present invention.

In accordance with another aspect of the present invention, there is provided a middle- or large-sized battery pack constructed in a structure in which the electrical connection of the battery pack is performed using the connecting member.

The middle- or large-sized battery pack according to the present invention may be used as a power source for vehicles, such as electric bicycles (e-bikes), electric motorcycles, electric vehicles, or hybrid electric vehicles, or as a power source for various applications and products, including industrial or domestic apparatuses. Preferably, the middle- or large-sized battery pack is used as a charging and discharging power source for electric vehicles.

In the middle- or large-sized battery pack according to the present invention, the electrical connection between battery modules is accomplished using the equal distribution type connecting member. Consequently, the current difference does not occur between the battery modules even under a large current condition, and therefore, the degradation of specific battery modules or the secondary battery cells in the specific battery modules is prevented during the long-term use of the middle- or large-sized battery pack.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
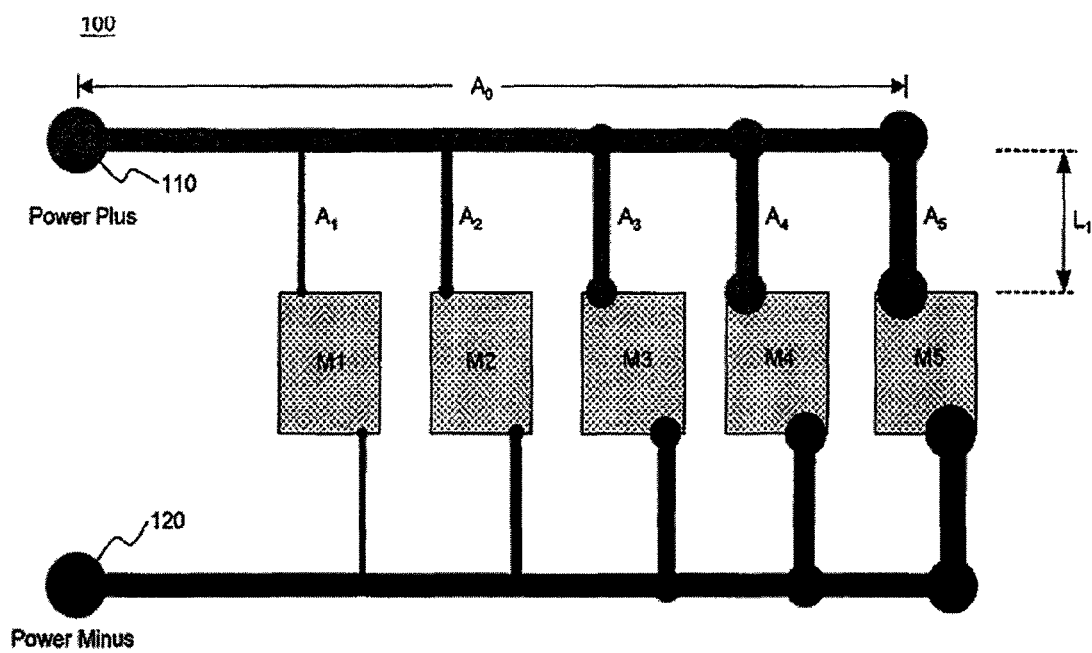
FIG. 1 is a conceptional view illustrating the structure of an equal distribution type connecting member according to a preferred embodiment of the present invention.

FIG. 1 is a conceptional view typically illustrating the structure of an equal distribution type connecting member according to a preferred embodiment of the present invention.

Referring to FIG. 1, the connecting member 100 according to the present invention electrically connects battery modules M1, M2, M3, M4, and M5, as devices, in parallel with each other. Specifically, the connecting member 100 includes a first connection circuit $A_0$ connected to an external circuit connection point 110 and second connection circuits $A_1$, $A_2$, $A_3$, $A_4$, and $A_5$ connected sequentially between the first connection circuit $A_0$ and the respective battery modules M1, M2, M3, M4, and M5.

The first connection circuit $A_0$ has a uniform width and thickness.

On the other hand, the second connection circuits $A_1$, $A_2$, $A_3$, $A_4$, and $A_5$, connected to the first connection circuit $A_0$, have the same length $L_1$ and thickness, whereas the widths of the second connection circuits $A_1$, $A_2$, $A_3$, $A_4$, and $A_5$ are gradually increased with the increase of the electrical connection distance between the external circuit connection point 110 and the battery modules M1, M2, M3, M4, and M5. As a result, the internal resistances between the external circuit connection point 110 and the device connection points are equalized.

Unlike the structure shown in FIG. 1, it is possible to construct the second connection circuits $A_1$, $A_2$, $A_3$, $A_4$, and $A_5$ such that the widths and thicknesses of the second connection circuits $A_1$, $A_2$, $A_3$, $A_4$, and $A_5$ are the same, whereas the lengths of the second connection circuits $A_1$, $A_2$, $A_3$, $A_4$, and $A_5$ are sequentially increased. Alternatively, it is possible to construct the second connection circuits $A_1$, $A_2$, $A_3$, $A_4$, and $A_5$ such that the lengths and the widths of the second connection circuits $A_1$, $A_2$, $A_3$, $A_4$, and $A_5$ are the same, whereas the thicknesses of the second connection circuits $A_1$, $A_2$, $A_3$, $A_4$, and $A_5$ are sequentially increased. Alternatively, it is also possible to construct the second connection circuits $A_1$, $A_2$, $A_3$, $A_4$, and $A_5$ such that one of three elements, such as the lengths, the thicknesses, and the widths, of the second connection circuits $A_1$, $A_2$, $A_3$, $A_4$, and $A_5$ are the same, whereas the remaining two elements of the second connection circuits $A_1$, $A_2$, $A_3$, $A_4$, and $A_5$ are changed.

Figure 2:
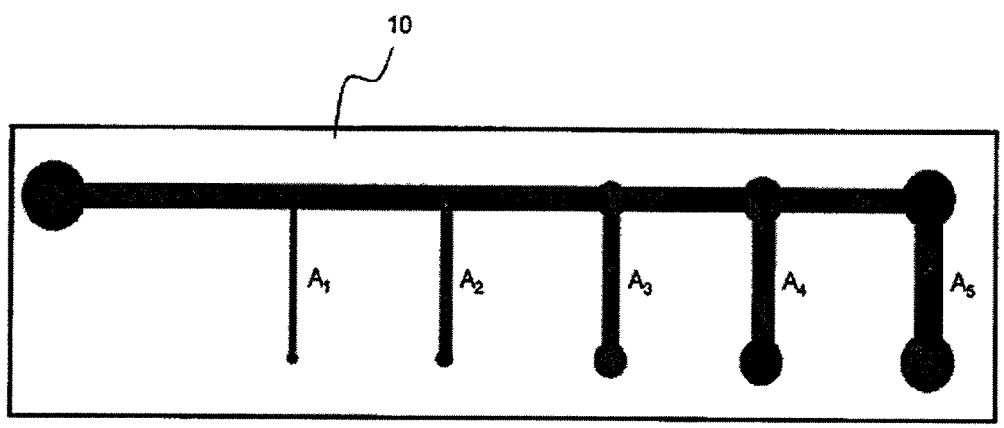
FIG. 2 is a conceptional view illustrating a method of manufacturing the equal distribution type connecting member of FIG. 1 according to a preferred embodiment of the present invention.

FIG. 2 is a conceptional view typically illustrating a method of manufacturing the equal distribution type connecting member of FIG. 1 according to a preferred embodiment of the present invention.

Referring to FIG. 2, resistance values of devices are calculated to decide sectional areas and lengths of the first connection circuit $A_0$ and the second connection circuits $A_1$, $A_2$, $A_3$, $A_4$, and $A_5$. Subsequently, the first connection circuit $A_0$ and the second connection circuits $A_1$, $A_2$, $A_3$, $A_4$, and $A_5$ are drawn on a single metal plate 10, and then the single metal plate 10 is cut along the drawing line using a specific cutting member (not shown). During the cutting of the single metal plate 10, the connection between the first connection circuit $A_0$ and the second connection circuits $A_1$, $A_2$, $A_3$, $A_4$, and $A_5$ are maintained, and therefore, the productivity is improved.

According to another method of manufacturing the connecting member, the first connection circuit $A_0$ and the second connection circuits $A_1$, $A_2$, $A_3$, $A_4$, and $A_5$ are drawn on the single metal plate 10. Subsequently, the single metal plate 10 is cut along the drawing line such that the first connection circuit $A_0$ is separated from the second connection circuits $A_1$, $A_2$, $A_3$, $A_4$, and $A_5$, and then the second connection circuits $A_1$, $A_2$, $A_3$, $A_4$, and $A_5$ are coupled to the first connection circuit $A_0$. In the latter case, it is possible for the connecting member to flexibly correspond to the change in shape due to the change in design and to reuse the connecting member.

Figure 3:
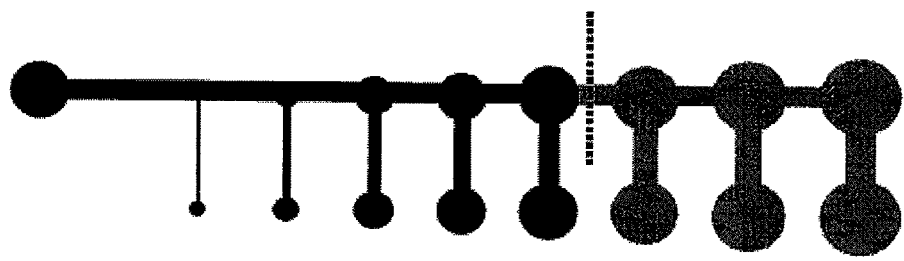
FIG. 3 is a conceptional view illustrating cutting and use of the equal distribution type connecting member manufactured by the method of FIG. 2 according to circumstances.

FIG. 3 is a conceptional view illustrating cutting and use of the equal distribution type connecting member manufactured by the method of FIG. 2 according to circumstances. As shown in the drawing, the connection member according to the present invention may be manufactured with a predetermined size, i.e., a standardized size, and then appropriately cut depending upon the number of devices to be used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the connecting member includes two parts, i.e., the first connection circuit and the second connection circuits. Consequently, the present invention has the effect of improving the flexibility and extensionability corresponding to the change in design and reducing the difference of internal resistances due to the circuits, thereby preventing the occurrence of current difference even during the conduction of high current. Therefore, as an example, when the connecting member according to the present invention is used in a middle- or large-sized battery pack, the degradation of battery modules or battery cells constituting the battery modules are prevented, with the result that the overall life span of the battery pack is increased, and the uniform charging and discharging efficiency of the battery modules or the battery cells is acquired. Consequently, it is possible to easily manufacture battery modules having optimized performance and a middle- or large-sized battery pack including the same.

What is claimed is:

1. A connecting member for connecting two or more devices to an external circuit, the connection member including:

a first connection circuit having a first end connected to a connection point of the external circuit, and a second end disposed distal from the first end; and second connection circuits sequentially connected to the first connection circuit at different locations in regular intervals between the first end of the first connection circuit and respective devices, the second connection circuits being constructed in a structure in which widths of the second connection circuits are increased with an increase of a connection distance between the connection point of the external circuit and connection points of the two or more devices, under the condition that the second connection circuits have the same thickness as that of the first connection circuit, thereby equalizing internal resistances between the connection point of the external circuit and the connection points of the two or more devices, wherein the first connection circuit and the second connection circuits are of a single metal plate, and wherein the widest one of the second connection circuits is connected to the second end of the first connection circuit.

2. The connecting member according to claim 1, wherein each device is a battery cell that can be charged and discharged or a battery module including a plurality of battery cells.

3. A battery pack comprising the connecting member according to claim 1, wherein the connecting member forms an electrical connection of the battery pack to the external circuit.

4. A battery pack comprising the connecting member according to claim 2, wherein the connecting member forms an electrical connection of the battery pack to the external circuit.

* * * * *